United States Patent [19]

Numata

[11] 4,335,943
[45] Jun. 22, 1982

[54] COLOR COMPENSATING DEVICE FOR A CAMERA

[76] Inventor: Saburo Numata, 3-4948-501, Minamiurawa, Urawa-shi, Saitama-ken, Japan

[21] Appl. No.: 211,437

[22] Filed: Nov. 28, 1980

Related U.S. Application Data

[63] Continuation-in-part of Ser. No. 96,059, Nov. 29, 1979, abandoned.

[30] Foreign Application Priority Data

Nov. 22, 1978 [JP] Japan ................................ 53-144500

[51] Int. Cl.³ ............................................. G03B 7/081
[52] U.S. Cl. .................................... 354/60 R; 354/83
[58] Field of Search ............... 354/22, 23 R, 31, 60 R, 354/60 E, 60 L, 83, 100–104, 202, 295, 60 A, 60 F; 355/35–38, 67–71

[56] References Cited

U.S. PATENT DOCUMENTS

| | | | |
|---|---|---|---|
| 3,827,071 | 7/1974 | Turpin | 354/295 |
| 3,887,279 | 6/1975 | Rubin | 355/38 |
| 3,924,121 | 12/1975 | Barbieri | 355/38 X |
| 3,936,852 | 2/1976 | Turpin | 354/202 |

*Primary Examiner*—L. T. Hix
*Assistant Examiner*—W. J. Brady
*Attorney, Agent, or Firm*—Pasquale A. Razzano

[57] ABSTRACT

Light sources of different colors, such as additive or subtractive primaries, are provided within a camera body to expose the film to the colored light as an auxiliary exposure. The auxiliary exposure is imparted to the film simultaneously with, before or after the normal exposure at the time of photographing. The light sources can be, for example, LED's which emit different colors, or a combination of a white light source and color filters of different colors provided in front of the light source.

6 Claims, 5 Drawing Figures

COLOR COMPENSATING DEVICE FOR A CAMERA

This application is a continuation-in-part of U.S. patent application Ser. No. 96,059, filed Nov. 29, 1979, now abandoned.

BACKGROUND OF THE INVENTION

1. Field of the Invention

This invention relates to a color compensating device for a camera, and more particularly to a device for compensating the color of a color photograph when the color photograph is taken by a camera.

2. Description of the Prior Art

In general, color compensation of a color photograph is carried out in a color printer when the color photograph is printed on a photographic paper. In the color printer, the amount of light for printing is controlled separately for three primary colors of Blue, Green and Red to obtain a gray LATD (large area transmission density) based on $LATD_B$, $LATD_G$ and $LATD_R$.

However, in the color printer the print is made from a negative film which is already developed and has a fixed density and color balance, and accordingly there is a limit for the color compensation. When the print is made, the color temperature of the subject such as a light source color, the rising sun's color, the setting sun's color, the cloudy sky's color and so forth must particularly be known. However, it is difficult to know the color temperature only from an analysis of the developed color negative film. Therefore, it is difficult to fully compensate for the color temperature, and it often happens that the color negatives taken under the illumination of a fluorescent lamp yield color prints with a bluish color.

In order to provide an indication of the color temperature of the subject at the time of taking a picture, it has been proposed to record the three color components of the subject on the film when taking a picture by separating the light into three colors through blue, green, and red filters and exposing a part of the film to these color components of the light from the subject. With these color components recorded on the film, the color compensation can be made at the time of printing color prints. This method, however, is disadvantageous in that the color printer requires a special device for calculating the exposure time for the three color exposures after reading out the recorded information of the color temperature, in such a device is costly and difficult to put into practical use in the actual color printer.

Further, in a self-development camera, i.e., a so-called "instant camera", the color of the photograph becomes different depending upon the film temperature at the time of taking a picture. Therefore, the color compensation is very difficult.

SUMMARY OF THE INVENTION

The object of the present invention is to provide a camera in which color compensation can be made at the time of taking a picture.

Another object of the present invention is to provide a camera for a color photograph which is capable of making color compensation for color temperature at the time of taking a picture.

Still another object of the present invention is to provide a camera for a color photograph which is capable of making color compensation for the color obtained depending on the temperature in a self-development camera.

The camera in accordance with the present invention is provided with a color compensating device which is capable of compensating color at the time of taking a picture by use of light sources of different color. The film is exposed to the light sources of different color provided within the camera for color compensation at the time of taking a picture during, before, or after the exposure of the film to the light from the subject. The exposure time for different colors is controlled according to the color temperature of the subject or the temperature at the time of taking the picture so as to finally obtain a color negative film of good color balance.

In case of compensating for the color balance in view of the color temperature of a light source, the light from the subject which is a reflection of the light source is measured of its three color components through a TTL system (through the taking lens) or an external light take-in system to know the bias of color phase and the necessary amount of exposures of the three colors for compensation is calculated based thereon. The compensation is conducted by use of light sources of three primary colors such as blue, green and red, or cyan, magenta and yellow. By controlling the exposure time of the three primary colors of light, the color compensation is conducted in accordance with this invention.

As the three primary colors, additive primaries of blue, green and red, or subtractive primaries of cyan, magenta and yellow are selected. The three colors are not restricted to be of these colors but must be ones which make white light when used together.

By exposing the film to the color light of the auxiliary exposure light sources, the color compensation is performed, but the amount of total exposure is exceeded by the amount of the auxiliary exposure. Therefore, the exposure must be decreased by that amount when taking a picture.

In case of compensating for the color obtained depending upon the temperature in a self-development camera, the temperature is measured and the color compensation by use of the auxiliary exposure to the three color light sources is conducted based on the measured temperature.

Further, it is of course possible to make color compensation for both the color temperature and the temperature simultaneously in the camera.

DESCRIPTION OF THE PREFERRED EMBODIMENT

Figure 1:
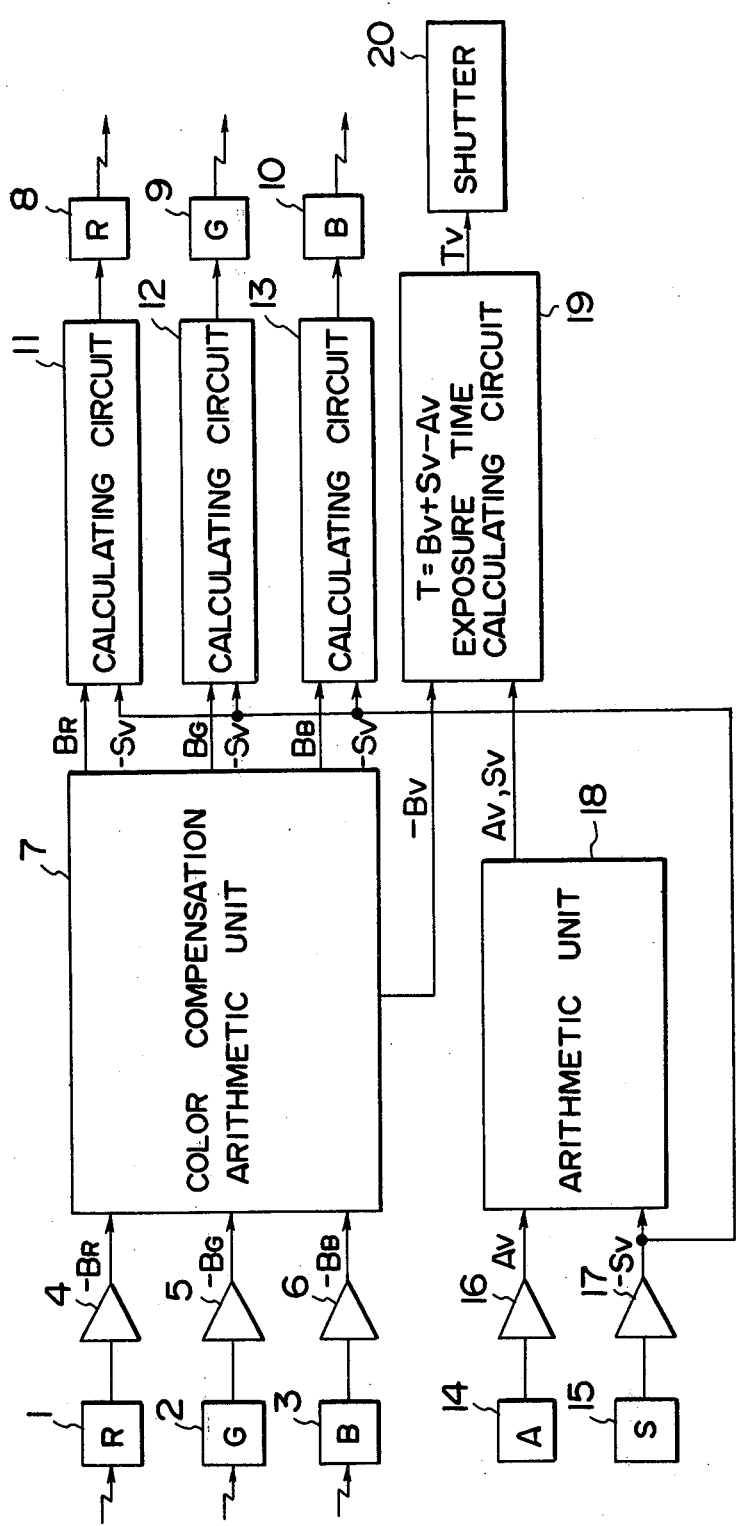
FIG. 1 is a block diagram which shows an example of the color compensating device in accordance with the present invention.
Figure 2:
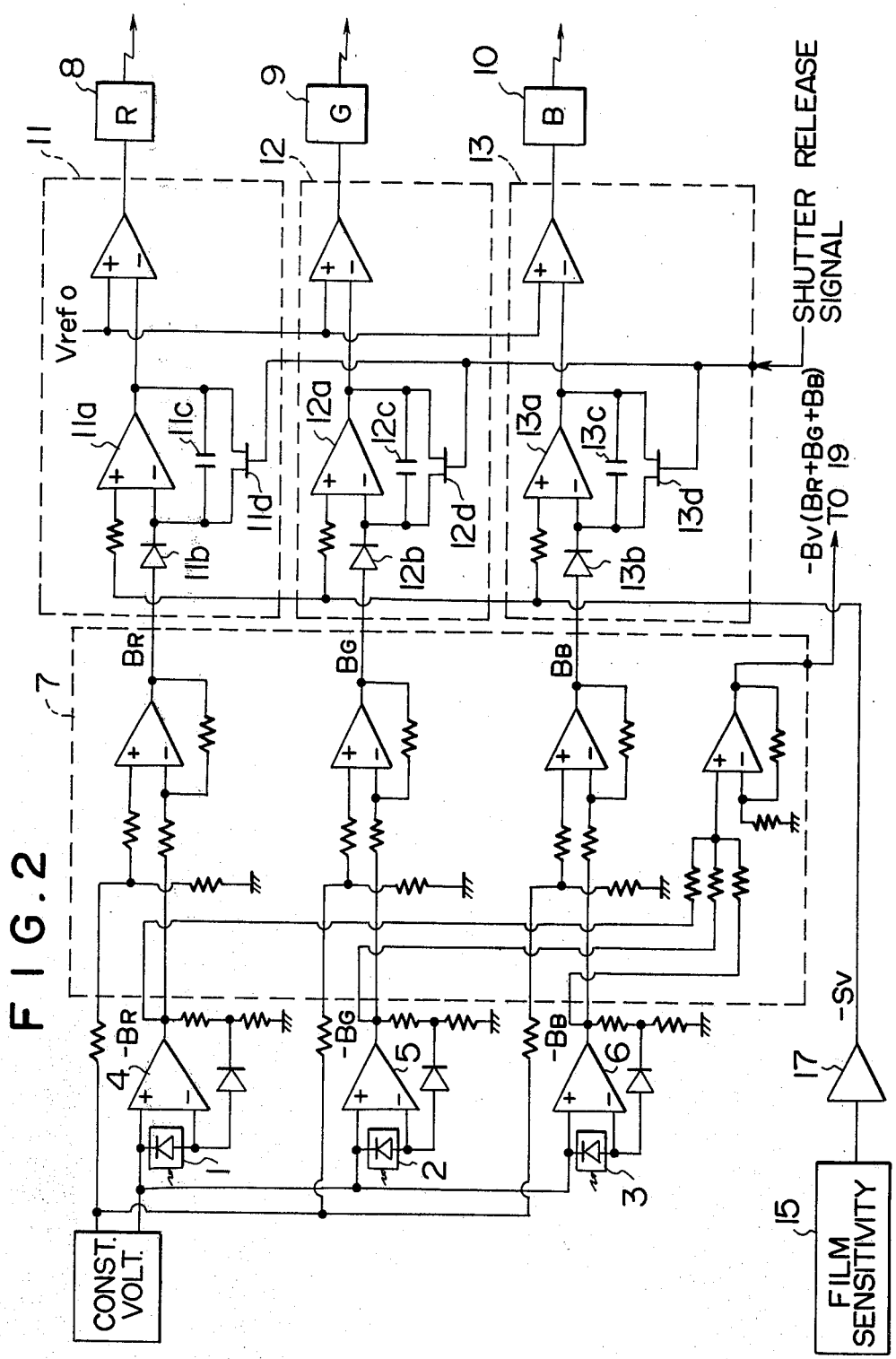
FIG. 2 is a detailed circuit view showing a part of the block diagram of FIG. 1.
Figure 3:
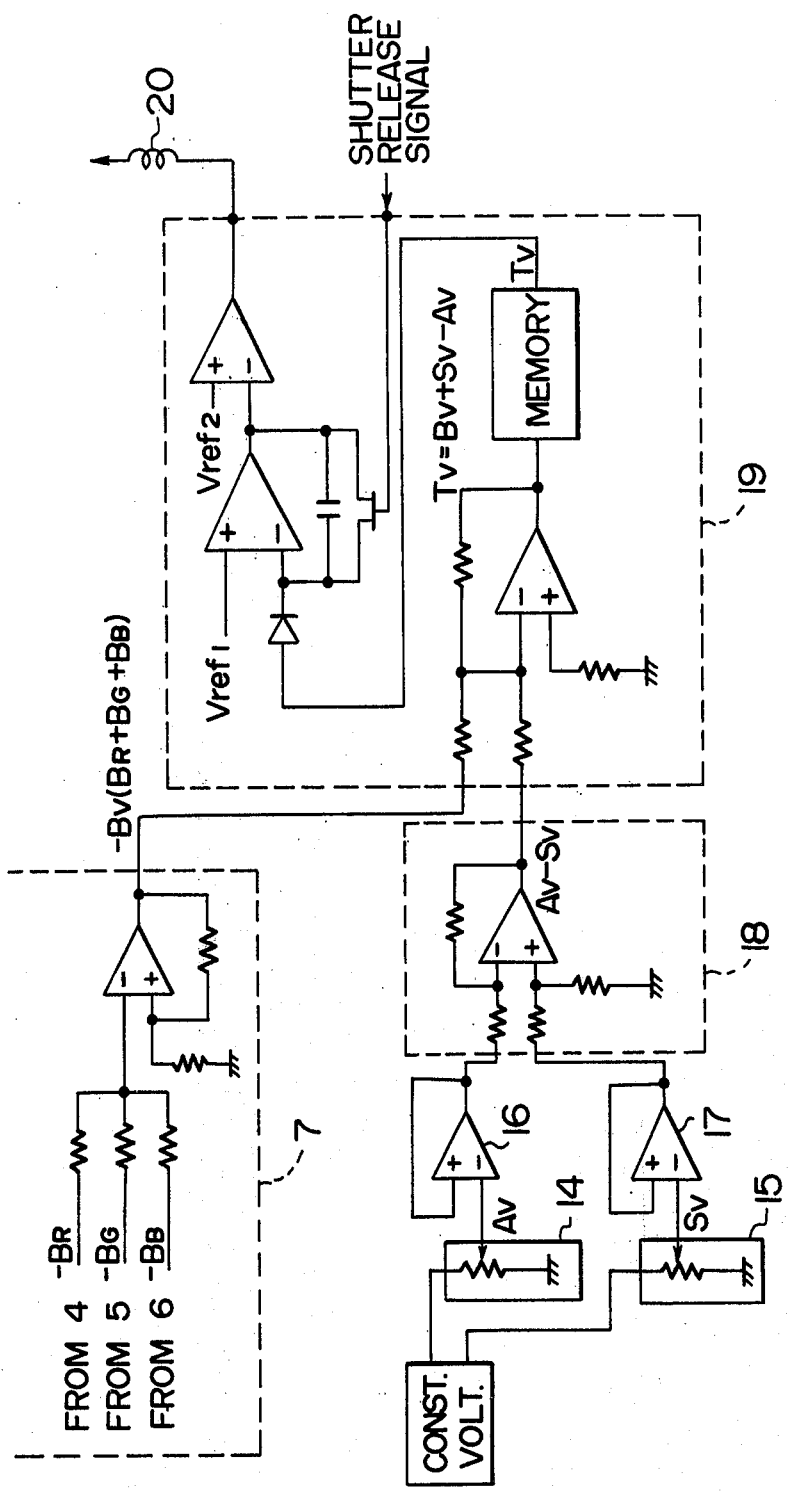
FIG. 3 is a detailed circuit view showing another part of the block diagram of FIG. 1.

FIGS. 1, 2 and 3 show an embodiment of the present invention in which the light from the subject to be photographed is measured of its three color components by a red detecting detector 1, green detecting detector 2 and blue detecting detector 3. These detectors 1, 2 and 3 are arranged in a viewfinder of a single lens relex camera or in front of the camera body and measure the three color components by a TTL system or an external light take-in system.

The output signals of the photodetectors 1, 2 and 3 are amplified by amplifiers 4, 5 and 6, respectively, and then sent to a color compensation arithmetic unit 7. In this arithmetic unit 7, the color temperature is calculated based on the three color components. The color temperature indicates the distribution ratio of the three color components, from which the bias of the color phase can be known. With the bias of the color phase, the color phase for making white light by color addition is known.

Therefore, in the color compensation arithmetic unit 7 the exposure time for the three colors for compensation for the calculated color temperature is programed. In other words, the exposure time or turn-on time of the red LED 8 for emitting red light, the green LED 9 for emitting green light and the blue LED 10 for emitting blue light is programed in the unit 7 for the corresponding color temperature. The necessary color phase can also be obtained by controlling the intensity of the light sources of LED's for the three colors.

The LED's 8, 9 and 10 are provided within the camera body, for instance, in the dark box to expose the film in the camera to the color light to give an auxiliary exposure. It will be noted that the red, green and blue can be replaced by cyan, magenta and yellow. Further, it is also possible to use a combination of three white light sources and three color filters located in front thereof.

In order to control the exposure for the color compensation, emission light amount calculating circuits 11, 12 and 13 are inserted between the LED's 8, 9 and 10 and the color compensation arithmetic unit 7. The color compensation arithmetic unit 7 receives outputs $-B_R$, $-B_G$, $-B_B$ from the amplifiers 4, 5, 6 of the detectors 1, 2, 3 and converts the output into voltages $B_R$, $B_G$, $B_B$ representing the amount of color components used for controlling the LED's 8, 9, 10. Further, it also obtains a total intensity $B_V (=B_R+B_G+B_B)$ of the three color components to be used for controlling a shutter through an exposure time calculating circuit 19.

The emission light amount calculating circuits 11, 12, 13 receives the outputs $B_R$, $B_G$, $B_B$ from the arithmetic unit 7 and compares these outputs $B_R$, $B_G$, $B_B$ with film sensitivity information $-S_V$ from a film sensitivity setting means 15. The difference between the outputs $B_R$, $B_G$, $B_B$ (in voltage) and the film sensitivity information $-S_V$ (in voltage) is converted to a time period by integrating circuits including operational amplifiers 11a, 12a, 13a, log expansion diodes 11b, 12b, 13b and integrating capacitors 11c, 12c, 13c. Switching elements like MOS FET 11d, 12d, 13d are connected in parallel with the integrating capacitors 11c, 12c, 13c and operated by a shutter release signal so that the integration may start upon release of the shutter. The integrating circuits output time periods corresponding to the difference between the color outputs $B_R$, $B_G$, $B_B$ and the film sensitivity information $S_V$, i.e. the larger is the difference which means the higher is the color brightness, the shorter is the time period, and the smaller is the difference which means the lower is the color brightness, the longer is the time period. Thus, the LED's 8, 9, 10 are excited to emit light for a time period required for compensation.

Information regarding the aperture size of a stop $(A_V)$ is introduced from an aperture size setting means 14, and the information regarding the film sensitivity $(S_V)$ is introduced from a film sensitivity setting means 15 (See FIG. 3). The output signals from these means 14 and 15 are inputted into an arithmetic unit 18 by way of amplifiers 16 and 17, respectively. The film sensitivity information $(S_V)$ amplified by the amplifier 17 is also sent to the calculating circuits 11, 12 and 13 (See FIG. 2).

At the arithmetic unit 18, the film sensitivity information $(S_V)$ and the aperture size information $(A_V)$ are processed and the calculated result is sent to an exposure time calculating circuit 19. The exposure time calculating circuit 19 is also provided with an input of the intensity information $(B_V)$ from the color compensation arithmetic unit 7. The intensity information $(B_V)$ is obtained from the total of the intensities of the three color components $(B_R+B_G+B_B)$ measured by the red, green and blue detectors 1, 2 and 3.

At the exposure time calculating circuit 19 the exposure time $(T_V)$ is calculated and a shutter 20 is controlled by the calculated exposure time $(T_V)$.

In accordance with the present invention, the three color components of the light from the subject to be photographed are measured by the detectors 1, 2 and 3, and the turn-on time of the three LED's 8, 9 and 10 for three colors is calculated based on the measured color components. By the LED's 8, 9 and 10, the bias of the color phase is corrected on the film and a color balanced exposure is obtained on the film.

Further, the shutter speed $(T_V)$ is controlled in view of the value corresponding to the auxiliary exposure and the value corresponding to the scene brightness or the intensity of illumination on the subject $(B_V)$ by said calculating circuit 19. Since the film sensitivity information $(S_V)$ from the film sensitivity setting means 15 and the aperture size information $(A_V)$ from the aperture size setting means 14 are both introduced into the calculating circuit 19 by way of the arithmetic unit 18, the shutter speed $(T_V)$ finally obtained is based on all the necessary information $(B_V, S_V, A_V)$ and accordingly a correct color-balanced exposure can be obtained.

Figure 4:
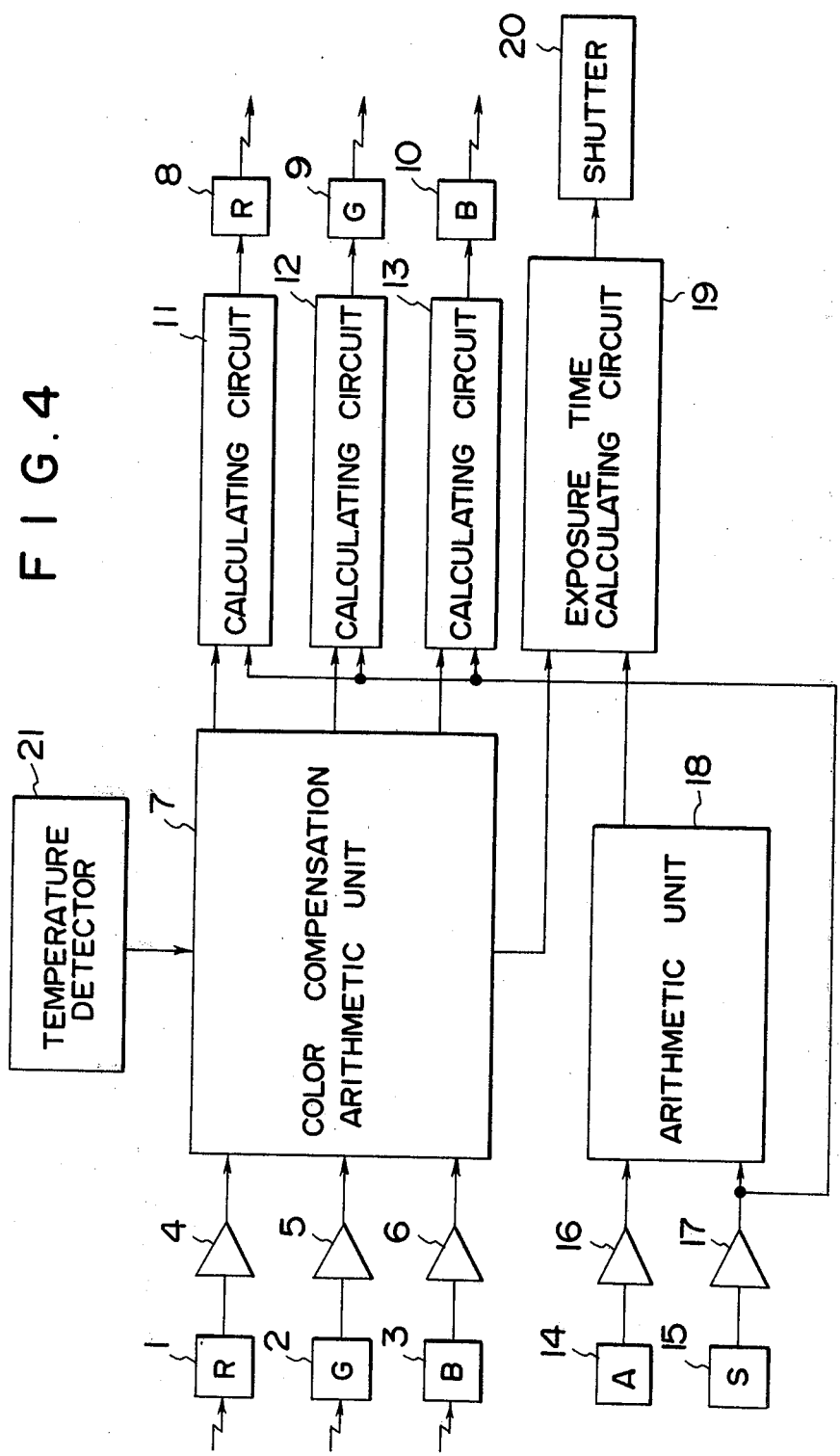
FIG. 4 is a block diagram which shows another example of the color compensating device in accordance with the present invention.

FIG. 4 shows another embodiment of the present invention in which both the color temperature of the subject and the temperature at which the self development film is processed are taken into consideration. In this embodiment, a temperature detector 21 for detecting or measuring the temperature of the self-development film is provided near the film in the camera. The signal from the temperature detector 21 is sent to the color compensation arithmetic unit 7 to introduce a signal thereto representing the temperature at which the film is processed. In FIG. 4, all the elements equivalent to those shown in FIG. 1 are designated with the same reference numerals. The temperature at the film effects on the bias of the color phase. Thus, it is possible to make compensation for color bias due to the temperature around the film as well as the color temperature of the subject to be photographed.

It will be noted that with the embodiment shown in FIG. 4 it is also possible to make color compensation only for the effect of the temperature around the self-development film. In this case, the exposure time or turn-on time of the red emitting LED 8, green emitting LED 9 and blue emitting LED 10 is programed only in relation with the temperature measured by the temperature detector 21.

Figure 5:
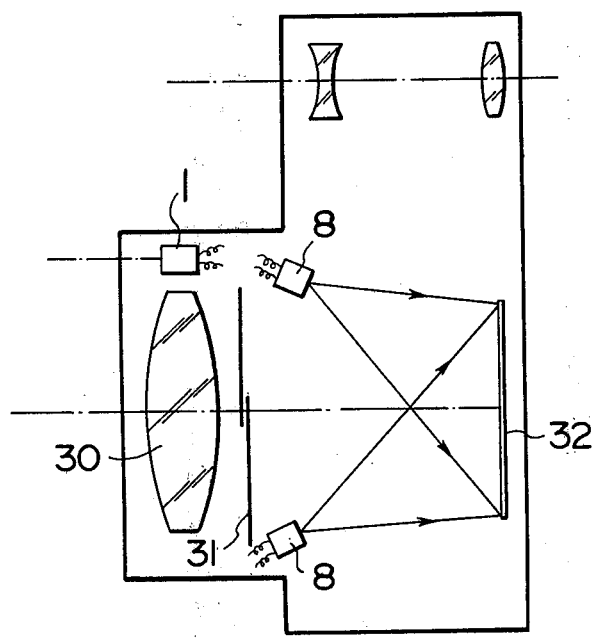
FIG. 5 is a vertical cross-sectional view showing an example of the camera provided with the device of this invention.

FIG. 5 schematically shows an example of a camera provided with the color compensating device of this invention. Referring to FIG. 5, the light passing through the taking lens 30 of the camera impinges upon the film 32 when a lens shutter 31 is opened. In order to uniformly expose the film 32 to the color compensating light from the auxiliary light sources 8, 9 and 10, the light sources for the three colors are located at the upper and lower positions in front of the film 32. In FIG. 5, only the upper and lower light sources 8 and 8 for red light are illustrated. Above the taking lens 30 is located a photodetector 1 for measuring the color components from the subject. In FIG. 5, only a photodetector 1 for red color component is illustrated.

While preferred embodiments of the invention have been described above, it should be recognized that the invention is not limited to those precise embodiments, and that many modifications and variations thereof would be apparent to persons of skill in the art, without departure from the scope and spirit of the invention as defined in the appended claims.

I claim:

1. A color compensating device for a camera comprising measuring means for measuring blue, green and red light components of the light from a subject to be photographed, a plurality of light sources of different colors provided within the camera, a color compensation arithmetic unit for calculating the necessary amount of light of different colors of said light sources to which the film in the camera should be exposed for color compensation based on the outputs of said measuring means, and means for turning on said light sources selectively according to the output of said arithmetic unit to expose the film to colors of light as necessary for color compensation.

2. A color compensating device for a camera as defined in claim 1, wherein said measuring means comprises color separating means for separating light from the subject to be photographed into three light components of primary colors, and light measuring means for measuring the amount of said light components.

3. A color compensating device for a camera comprising temperature measuring means for measuring the temperature of a self-development film in the camera, a plurality of light sources of different colors, detecting means for detecting the bias of color phase of the self-development film, a color compensation arithmetic unit for calculating the necessary amount of light of different colors of said light sources to which the film in the camera should be exposed for color compensation based on the output of said detecting means in conjunction with said temperature measuring means, and means for turning on said light sources selectively according to the output of said arithmetic unit to expose the film to the necessary color of light to achieve proper color compensation.

4. A color compensating device for a camera as defined in either claim 1 or claim 3 wherein said light sources comprise three white light sources, and three color filters of different colors located in front of said white light sources, respectively.

5. A color compensating device for a camera as defined in claim 4 wherein said color filters are blue, green, and red respectively.

6. A color compensating device for a camera as defined in claim 4 wherein said color filters are cyan, magenta, and yellow respectively.

* * * * *